Figure 1:
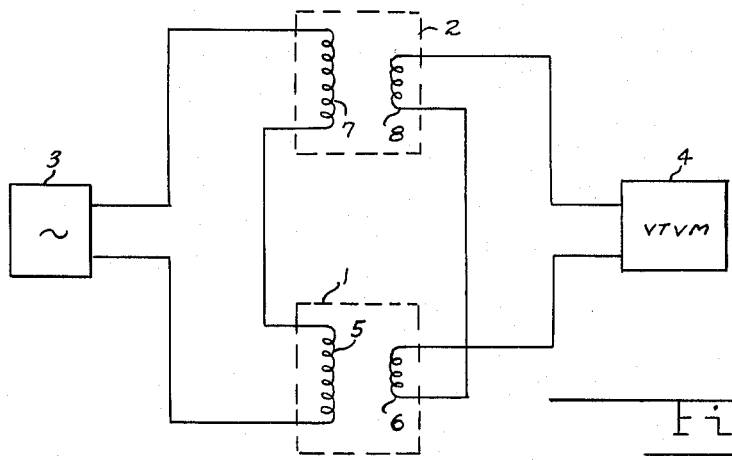

July 26, 1966   M. E. ANDERSON   3,262,309
STRAIN GAGE
Filed April 21, 1964                                2 Sheets-Sheet 1

INVENTOR.
MARVIN E. ANDERSON
BY
Wade Koontz
Robert Kern Duncan
ATTORNEYS

United States Patent Office 3,262,309
Patented July 26, 1966

3,262,309
STRAIN GAGE
Marvin E. Anderson, South Holland, Ill., assignor to the United States of America as represented by the Secretary of the Air Force
Filed Apr. 21, 1964, Ser. No. 361,600
3 Claims. (Cl. 73—88.5)

This invention relates to a device of the type commonly referred to as a strain gage. More specifically it relates to an electromagnetic device for measuring the deformation between two points a finite distance apart in fluids or semisolid materials such as soils, sands, plastics, and other similarly elastically deformable and substantially nonmagnetic substances.

Strain gages presently available for use in the measurement of soils and similar materials have the disadvantages of introducing a body foreign to the material within the gage length which influences the natural response of the material to deformations. Also the gages must be protected from binding due to particles of the material interfering with the moving linkages. In order to minimize the influence of the gage on the material being tested the testing has had to be done on a large scale basis; and, therefore, the testing has not been amenable to the laboratory. In previous gages the frequency response of the gage has been such that dynamic measurements encompassing the rise time of shock waves on the materials could not be measured.

Ideally strain should be determined at a point. Practically, this cannot be done. It is necessary instead to use an average strain obtained by measuring the change in spacing of two points a finite distance apart. Obviously, only when the strain is uniform in the zone between the gage sensing elements is the measured average strain equal to the true strain. This physical limitation becomes most significant in the determination of strains produced by a passing shock wave. Under these conditions, the strains will change most rapidly in the vicinity of the shock front. Hence, the strain in the region between the gage elements will be very nonuniform as the shock front passes from one gage element to the other. The severity of this limitation in actual application will depend upon the rise time of the wave front, but it is clearly desirable to make the gage length (i.e. the distance between the sensing elements) as small as it is feasibly possible. Because of the unique operation of the invention disclosed herein the gage elements may be spaced relatively close together.

The operation of the present invention employs the principle of the differential transformer. The electromagnetic coupling existing between two coils placed in the material, of which it is desired to know the strain characteristics, is balanced against the coupling between two similar coils under controlled conditions outside the material.

An object of the present invention is to provide a strain gage that does not impose any material within the measuring deformation length of the substance being tested.

Another object is to provide a strain gage with good high frequency response.

Another object is to provide a strain gage that is responsive to shock waves.

Another object is to provide a strain gage that is responsive to both static and dynamic strains.

Another object is to provide a strain gage that does not have any physical connection between the gage elements.

Another object is to provide a gage that is insensitive to the effects of lateral and shearing strains.

Another object is to provide a gage that offers substantially no resistance to the movement that actuates the gage.

Further objects and features of the invention will be apparent from the following description and accompanying drawings illustrating an embodiment thereof by way of example.

Figure 2:
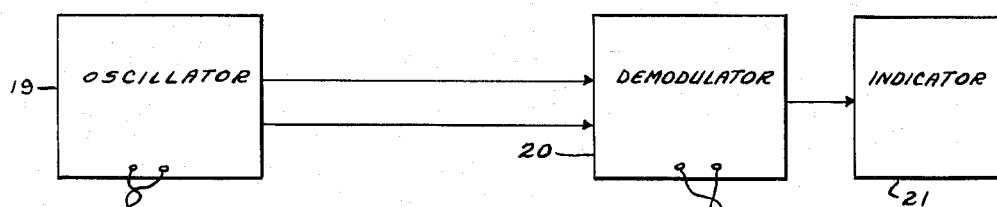
Figure 2:
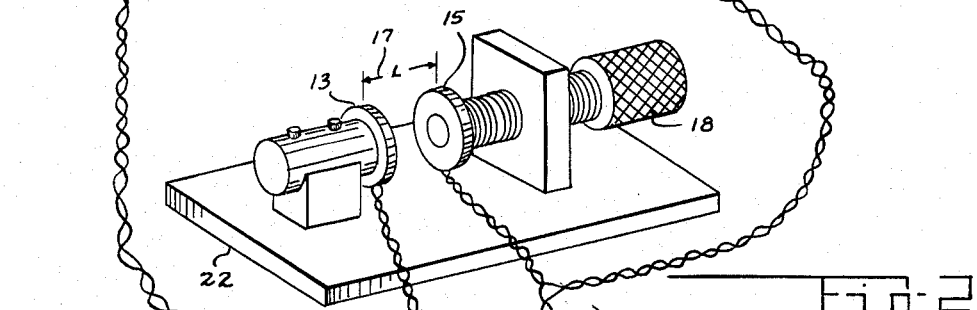
Figure 2:
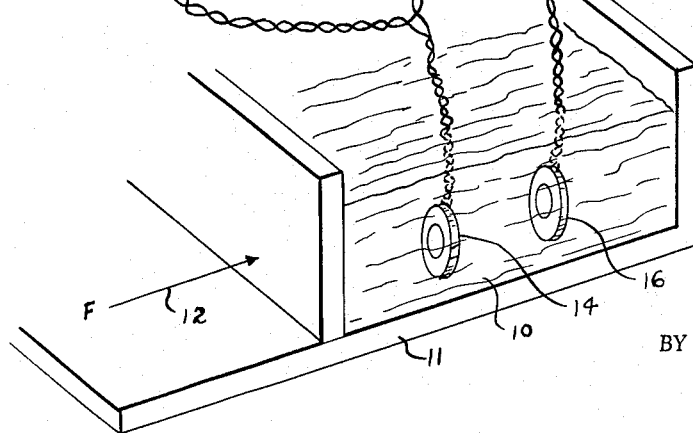
Figure 3:
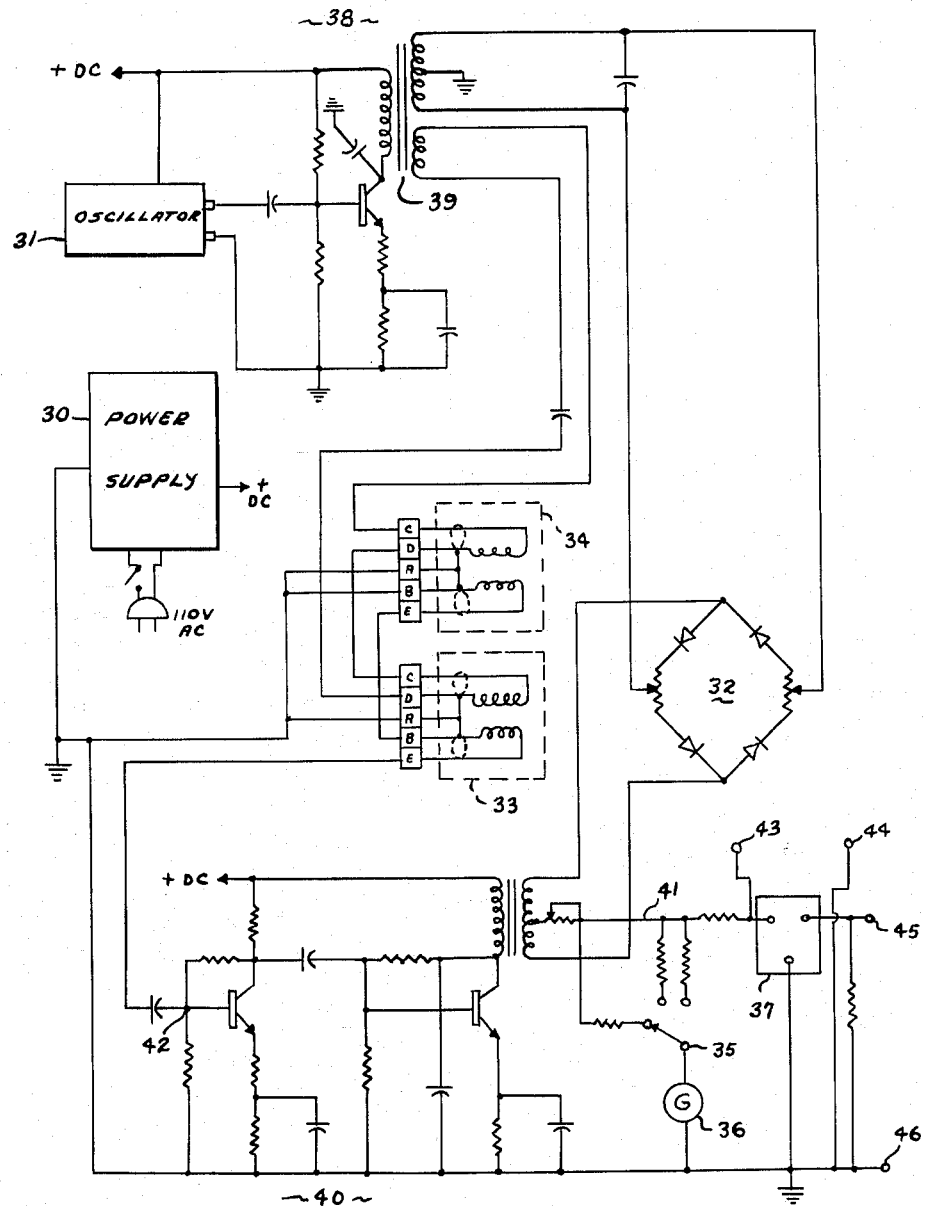

In the drawings:
FIG. 1 is a block diagrammatic view showing the fundamental electrical operation of the gage.
FIG. 2 is a block-pictorial representation of the gage system.
FIG. 3 is a schematic drawing of the electrical system of the gage.

The principle of operation of the gage is based on the differential transformer action as shown in FIG. 1. An alternating current source 3 energizes two driving coils 5 and 7 creating an alternating electromagnetic flux field about each. It is well known that when a coil of wire is placed within a varying flux field a voltage is induced within the coil. This coil may be termed a sensing coil. The magnitude of this induced voltage is a direct function of the spacing of the sensing coil from the driving coil. The polarity of the induced voltage is a function of the relative directions of the windings of the coils. Thus, sensing coil 6 has an induced voltage created by the current flow in driving coil 5, and likewise coil 8 has a voltage induced from the current flow in coil 7. It is readily apparent that if the coils and the geometries of the coil set 1 are equivalent to those of the coil set 2, equal voltages will be induced in sensing coils 6 and 8. When the electrical outputs from these sensing coils are connected in electrical opposition, the resultant voltage is zero and the voltmeter 4 will indicate a null. It can now be seen that if other conditions are held essentially equal in the two coil sets 1 and 2, when a null is indicated on the meter 4, the spacing between coils 7 and 8 will be a measure of the spacing between coils 5 and 6. The coils 5 and 6 may be embedded within the material or substance of which it is desired to know the strain characteristics, and the spacing between coils 7 and 8 adjusted until meter 4 indicates null. The linear distance between coils 7 and 8 now equals that between coils 5 and 6. As pressure is applied to the substance containing coil set 1 causing it to deform a variation occurs in the spacing between coils 5 and 6. The spacing between coils 7 and 8 is now adjusted until meter 4 is again nulled. This results in a new spacing between coils 7 and 8 equal to the spacing between the coils 5 and 6 after the application of the deforming force. The strain, defined as the amount of deformation divided by the length over which that deformation occurred, may now be determined.

By way of example, an embodiment of this invention as a gage for the measurement of the strain in samples of soil is shown in block-pictorial representation in FIG. 2 and in schematic form in FIG. 3.

Soil sample 10 is placed in holder 11. Driver coil 14 and sensing coil 16 are embedded within the soil in approximate axial relationship. Perfect axial alignment cannot, of course, ever be realized. It has been found desirable, in order to reduce the sensitivity of the device to small axial misalignments, to make the driving coils larger in diameter than the sensing coils. A ratio of approximately two-to-one has been found desirable for both the number of turns and the inside coil diameter. For laboratory soil measurements driving coils may be constructed of approximately 300 turns of number 40 magnet wire wound to approximately $\frac{1}{32}$ inch in thickness and an outside diameter of approximately $\frac{3}{4}$ inch. The coils may then be encapsulated with a covering of epoxy approximately $\frac{1}{64}$ inch thick. The sensing coils are scaled accordingly. This produces coils having a density of approximately 120 pounds per cubic foot, which falls within the range of most soils. This tends to prevent any impedance discontinuities being presented to pressure waves traversing the sample. For coils of these dimensions axial spacing between the driving coil and the sensing coils may vary between 0.2 inch and 0.5 inch without causing a departure of more than 1 percent in the agreement of repetitive null spacings.

The effect of the permeability change in the flux field due to soil with a high iron content is small. For the coils mentioned the maximum error with Kaolinitic clay containing 4 percent iron powder is approximately 2¼ percent; occurring at a coil spacing of 0.2 inch.

Driving coil 13 and sensing coil 15 are located on precision mount 22. Sensing coil 15 is rotatably mounted at the end of micrometer type adjusting device 18. The separation 17 of coils 13 and 15 may be measured directly or read from the calibrated micrometer. This value is also the separation of coils 14 and 16. A force 12 is applied and the resulting stress causes a strain within the soil. The deformation of the soil results in a relative movement between the driving coil 14 and the sensing coil 16. After adjusting micrometer spindle 18 so that a new null is obtained on indicator 21 the deformation within the soil may be read on the micrometer or the new length 17 determined and the amount of strain in the soil calculated.

The electrical circuit that may be used with the embodiment of the gage shown in FIG. 2 is set forth in FIG. 3. For this embodiment a 50 kc. electrical signal to energize in driving coils has been found to be satisfactory. Theoretically with this frequency the gage would be capable of sensing a shock wave having a rise time of the order of 20 microseconds. However, it has been found that practically the limitation of the gage occurs at about 75 microseconds. Oscillator 31 may be a conventional 50 kc. crystal controlled oscillator with an output of approximately one volt at an impedance of approximately 600 ohms. This signal is amplified by the stage of transistor amplification 38. Transformer 39 couples the 50 kc. signal to the driving coils and to the ring demodulator 32. Typical values of voltages are 10 volts across the series combination of both driving coils and also 10 volts to ground for each leg of the ring demodulator. As previously stated the sensing, or pickup coils, are connected differentially so that for equal spacing between the driving and sensing coils of the two sets of coils the resultant output is zero. When the spacing of the two sets is different, a small differential voltage appears at the input 42 of the amplifier 40. The amplitude of the envelope of the 50 kc. signal at the differential output of the sensing coils is the signal of interest; it being a direct function of the difference in the coil spacing between the coils of coil set 33 and those of coil set 34. To separate the envelope from the high frequency carrier, the signal is demodulated by a conventional ring demodulator 32. This type demodulator is sometimes called a synchronous detector and permits operation with a suppressed carrier. The demodulator output, therefore, is zero (voltage on line 41) when the carrier input at 42 is zero or nulled, and is either positive or negative in polarity when the two sensing coil voltages are not equal. The polarity depends on which sensing coil has the larger voltage, thereby indicating whether the coils which are embedded in the material have moved closer together or farther apart. Galvanometer 36, which may have a 100–0–100 microampere movement indicates the null and the polarity of the movement of embedded coils. Range switch 35 is used to vary the sensitivity of the indicating galvanometer 36.

The foregoing description of the operation of the gage has pertained mainly to the making of static strain measurements, in which the gage may be continually renulled as the strain takes place or nulled before the strain then renulled after the strain has occurred. For the dynamic measurement of strain including the measurement of the strain caused by the passing of shock waves through the material being tested the gage may be used in the following manner.

Filter 37 may be a 10 kc. low pass filter. In some instances, depending upon the degree of balance obtained in the circuitry, it may be desirable to filter out any remaining 50 kc. signal or components thereof in the signal. In such instances an oscilloscope having a D.C. deflection circuit amplifier is connected to test points 45 and 46, otherwise the oscilloscope may be connected to points 43 and 44.

The deflection of the trace in the oscilloscope is calibrated over the range of movement contemplated by the coils in the material due to the passage of the shock wave. This may be accomplished by using two precision mounts similar to mount 22 of FIG. 2. Thus for a particular initial spacing at which the electrical system is nulled, the deflection of the oscilloscope trace from its initial position will read the physical movement or departure of one set of the coils from their initial null condition. Instead of starting with the system nulled before making the dynamic measurement, the system may be set for a null at the maximum contemplated excursion and calibrated accordingly.

It will be understood that various changes in the details, materials, steps, and arrangements of parts, which have been herein described and illustrated in order to explain the nature of the invention, may be made by those skilled in the art within the principle and scope of the invention as expressed in the appended claims.

What is claimed is:

1. A strain gage for measuring the strain in a substance comprising: a first driving coil for emitting electromagnetic flux embedded within the substance; a first electromagnetic flux sensing coil embedded within the substance, magnetically coupled in substantially axial spaced-apart relationship with said first driving coil; a second driving coil, external to said substance, for emitting electromagnetic flux; a second electromagnetic flux sensing coil, external to said substance, magnetically coupled in substantially axial spaced-apart relationsihp with said second driving coil; a source of alternating current connected to said first and said second driving coil; connecting means connecting in electrical opposition said first and said second sensing coils; demodulation means cooperating with said source of alternating current and said connecting means providing an output which is indicative in magnitude and polarity of spacing differential between, said first driving coil and said first sensing coil, and said second driving coil and second sensing coil; means providing adjustment of said spaced-apart relation of said second driving coil and said second sensing coil; and indicating means cooperating with said output of said demodulation means.

2. A strain gage for measuring the strain within a substance stressed to deform comprising: a first driving coil for emitting electromagnetic flux in engaging relationship with said substance; a first electromagnetic flux sensing coil in engaging relationship with said substance, magnetically coupled in substantially axial spaced-apart relationship with said first driving coil; a second driving coil, external to said substance, for emitting electromagnetic flux; a second electromagnetic flux sensing coil, external to said substance, magnetically coupled in substantially axial spaced-apart relationship with said second driving coil; a source of alternating current; means connecting said alternating current source to said first and said second driving coils; connecting means differentially connecting said first and said second sensing coils; ring demodulation means cooperating with said source of alternating current and said connecting means providing an output which is indicative in magnitude and phase of spacing differential between said first driving coil and said first sensing coil, and said second driving coil and said second sensing coil; calibrated adjusting means cooperating with spaced-apart relation of said second driving coil and said second sensing coil; and null indicating means cooperating with said output of said demodulation means whereby at null indication the measurement of the magnitude of the said spaced-apart relationship of said first driving coil and said first sensing coil is provided by said calibrated adjustment means.

3. A strain gage for measuring the strain within a substance stressed to deform comprising: a first driving coil for emitting electromagnetic flux embedded within the substance; a first electromagnetic flux sensing coil embedded within the substance, magnetically coupled in substantially axial spaced-apart relationship with said first driving coil; a second driving coil, external to said substance, for emitting electromagnetic flux; a second electromagnetic flux sensing coil, external to said substance, magnetically coupled in substantially axial spaced-apart relationship with said second driving coil; a source of alternating current; means connecting said alternating current source to said first and said second driving coils; connecting means cooperating with said first and said second sensing coils providing a difference signal output; amplification means amplifying said difference signal; ring demodulation means cooperating with said source of alternating current and said amplifying means providing an output which is indicative in magnitude and polarity of spacing differential between, said first driving coil and said first sensing coil, and said second driving coil and said second sensing coil; calibrated axial positioning means cooperating with spaced-apart relation of said second driving coil and said second sensing coil; null indicating means cooperating with said output of said demodulation means whereby at null indication the measurement of the magnitude of the said spaced-apart relationship of said first driving coil and said first sensing coil is provided by said calibrated axial positioning means; and magnitude indicating means cooperating with said output of said demodulation means providing an indication of said magnitude of said spacing differential between, said first driving coil and said first sensing coil, and said second driving coil and said second sensing coil.

References Cited by the Examiner
UNITED STATES PATENTS

| | | | |
|---|---|---|---|
| 1,708,333 | 4/1929 | Smith | 73—88.5 |
| 2,532,231 | 11/1950 | Jarvis | 336—129 X |

RICHARD C. QUEISSER, *Primary Examiner.*

C. A. RUEHL, *Assistant Examiner.*